Patented Feb. 3, 1953

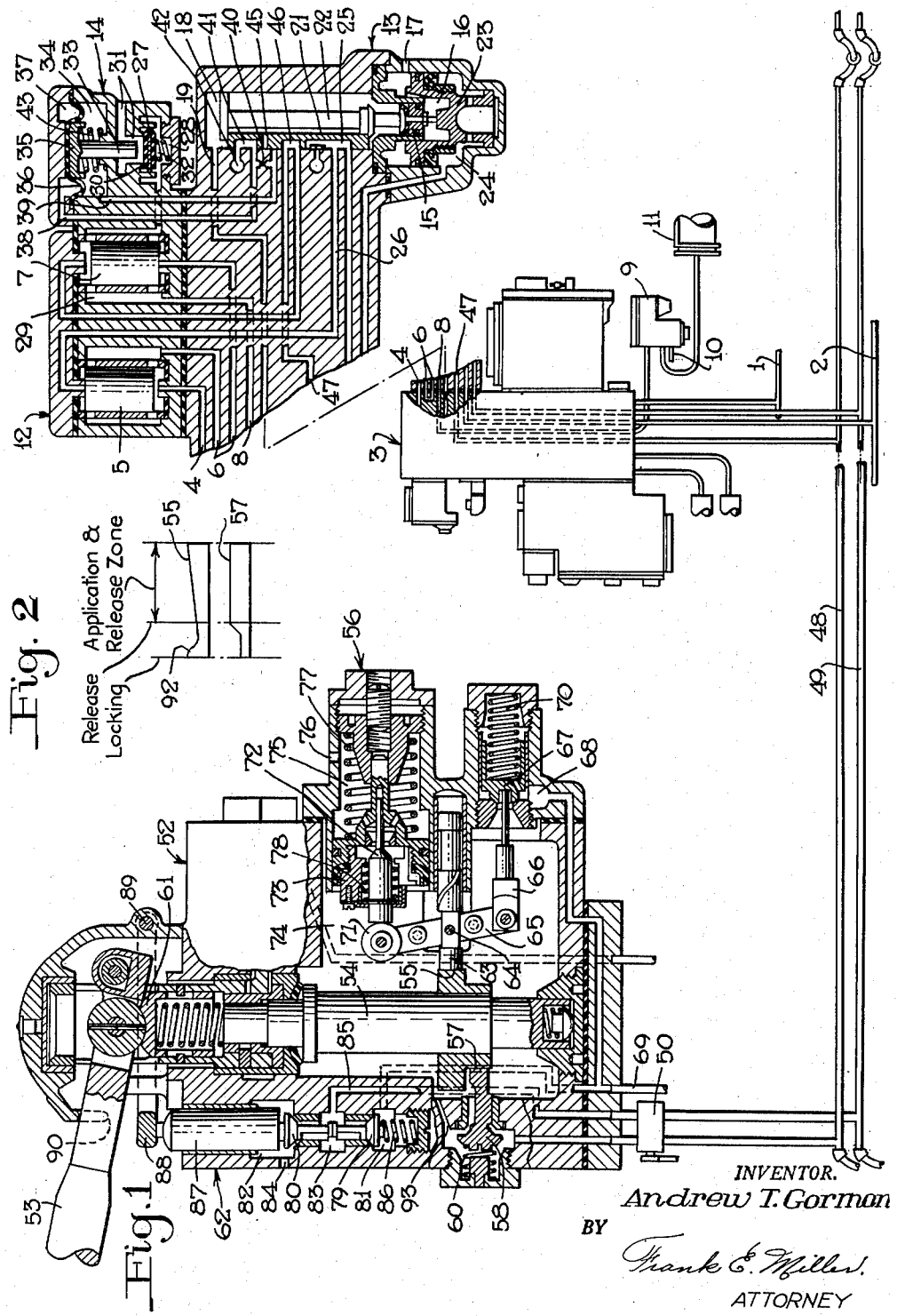

2,627,441

UNITED STATES PATENT OFFICE 2,627,441

FLUID PRESSURE BRAKE APPARATUS

Andrew T. Gorman, Pitcairn, Pa., assignor to Westinghouse Air Brake Company, a corporation of Pennsylvania Application June 27, 1950, Serial No. 170,592

7 Claims. (Cl. 303—26)

This invention relates to fluid pressure brake apparatus and more particularly to the type for use on railway locomotives.

The 24RL locomotive brake equipment shown and described in Westinghouse Air Brake Company's Instruction Pamphlet No. 5066 dated March 1948 is employed on modern diesel locomotives made up of a multiple of connected units usually including like end A units and one or more like intermediate B units. By operation of an engineer's automatic brake valve device on the leading A unit, the brakes on the locomotive and cars of a train are adapted to be controlled either on the electro-pneumatic straight air principle through the medium of a straight air pipe, or on the automatic principle through the medium of a brake pipe and a brake controlling valve device on each locomotive unit and each car of the train. An engineer's independent brake valve device is also provided on the leading A unit for controlling the brakes on the locomotive independently of those on the cars and for also, through the medium of an interlock valve device associated with the brake controlling valve device on each unit of the locomotive, causing a release of a brake application on the locomotive units effected either from the straight air pipe or brake pipe.

The interlock valve device on each unit comprises two double check valves for selectively closing the automatic, double check valves for selectively closing the automatic, electropneumatic straight air and independent brake control communication to a fluid pressure relay valve device which is operative to regulate the brake applying pressure in the usual locomotive brake cylinder device or devices on the respective unit according to the controlling pressure in the effective one of said communications. The interlock valve device further comprises an independent release valve device for releasing to atmosphere fluid under pressure from the relay valve device to release an application of locomotive brakes or to prevent an application thereof, and a selector valve device controlled by and cooperative with the engineer's independent brake valve device for controlling said release valve device. An actuating pipe and an application and release pipe extending through the several units connects the independent brake valve device to the interlock valve devices on the several units, the actuating pipe providing for control of the selector valve devices and the application and release pipe being connected to said selector valve devices to provide for control of the independent release valve devices by the independent brake valve device.

The independent release valve device on each unit comprises a brake release valve controlling a fluid pressure release communication from the respective relay valve device to atmosphere and a pressure diaphragm adapted to respond to pressure of fluid acting on one side to open said valve. When the pressures acting on opposite sides of the diaphragm are substantially the same the valve is adapted to be closed by a spring.

The selector valve device on each unit has a normal position, assumed upon venting of the actuating pipe, for equalizing the opposing fluid pressures on opposite sides of the diaphragm in the respective release valve device to permit closing of the release valve therein and for establishing communication from the straight air pipe and application and release pipe to the respective double check valves. The selector valve also has a brake release position, which it will assume in response to the supply of fluid under pressure to actuating pipe, for closing communication between the straight air pipe and application and release pipe and the respective double check valves and for supplying fluid under pressure to the one side of the independent release valve diaphragm to operate same to open the respective brake release valve. In this brake release position of the selector valve device the application and release pipe is also opened to the opposite sides of the diaphragm and fluid under pressure is supplied thereto from the one side through a choked passage.

In order to release either an automatic or an electro-pneumatic straight air application of locomotive brakes, the handle of the independent brake valve device need only be depressed from a normally elevated position for supplying fluid under pressure to the actuating pipe to thereby cause the selector valve devices on the several units of the locomotive to move to their brake release positions for causing operation of the release valve devices to release the brakes on the respective units, the application and release pipe being vented through the independent brake valve device during such operation. If the application of brakes thus released is an electropneumatic straight air application, then if the handle of the independent brake valve device is permitted to return to its normal elevated position, the brakes will promptly reapply. To release and hold released an electro-pneumatic application of brakes, it is therefore customary to depress the handle as above mentioned and then move it into a locking position where it will stay depressed without manual effort. In this locking position the actuating pipe is held charged with fluid under pressure while the application and release pipe is disconnected from atmosphere at the brake valve device. Thus while the independent release valve on each unit is held open by fluid under pressure acting on the one side of the diaphragm the pressure of fluid will build up on the opposite side and in the connected application and release pipe by the supply through the above-mentioned choked passage on each unit and when such pressure is increased to a sufficient degree it will permit closing of the release valves on the several units. The flow capacity of the choked passages on the several units is relatively small, being just sufficient to insure that the release valve on each unit will remain open long enough for the brakes on that unit to release and then close in order to prevent release of brake applying fluid in case an automatic application of brakes should occur with the independent brake valve handle in locking position.

In a multiple unit locomotive the application and release pipe, as well as the actuating pipe, are connected between units by flexible hose and couplings which are subject to leakage of fluid under pressure and any such leakage will delay the build-up of pressure in the application and release pipe by the choked passages and thereby effect the time of closing of the independent release valves under the conditions just described. In fact, if the leakage is great enough sufficient pressure may never be obtained in the application and release pipe to permit closing of the independent release valves. Due to such leakage it will therefore be seen that if in response to a reduction in brake pipe pressure the brake controlling valve devices on the units operate to supply fluid under pressure for applying the brakes on such units a portion or all of this fluid will be lost to atmosphere before the independent release valves on the respective units close resulting in partial or complete loss of a desired application of brakes.

The principal object of the invention is therefore the provision of means for insuring that the independent release valves above-mentioned will close, as desired, even if leakage of fluid under pressure from the application and release pipe is of a maximum permissible degree.

Other objects and advantages will become apparent from the following, more detailed description of the invention.

In the accompanying drawing; Fig. 1 is a diagrammatic view of a portion of a locomotive brake apparatus for an A unit of a multiple unit diesel engine or the like and embodying the invention; and Fig. 2 is a diagrammatic development view of two cams embodied in an independent brake valve device shown in section in Fig. 1.

*Description*

The fluid pressure brake equipment with which the invention is adapted to be associated may be like that disposed in the Instruction Pamphlet above referred to, and also in part like that disclosed in my Patent No. 2,464,977 issued on March 22, 1949, in view of which the following description of the equipment will be limited to only such parts and their operation as essential to a clear understanding of the invention.

As shown in the drawing, the reference numerals 1 and 2 designate, respectively, a brake pipe and an electro-pneumatic straight air control pipe adapted to extend through the several units of the locomotive for connection with corresponding pipes on a train of cars at either end of the locomotive, depending upon which end is the leading end. An automatic brake valve device (not shown) adapted to be carried by each of the A units and to be connected to the brake pipe 1 is operable in the usual manner to effect a reduction in pressure of fluid in said brake pipe and to also recharge said brake pipe with fluid under pressure. The automatic brake valve device is also operative to supply and release fluid under pressure to and from the straight air pipe 2.

Each of the locomotive units is adapted to be provided with a brake controlling valve device 3 adapted to respond to a reduction in pressure of fluid in brake pipe 1 for supplying fluid under pressure to a passage 4 from which it is adapted to flow past the lower end of a double check valve 5 to a passage 6 and thence past the lower end of a double check valve 7 to an annular cavity 29 encircling the check valve 7 and from said cavity through a passage 8 to a relay valve device 9 which is adapted to respond to such pressure to provide from a pipe 10 fluid at a corresponding pressure in a brake cylinder device 11 for applying the brakes on the locomotive unit. The pipe 10 is adapted to be constantly supplied with fluid under pressure from the usual main reservoir pipe (not shown) extending through the locomotive. The brake controlling valve device 3 is adapted to operate in response to recharging of the brake pipe 1 with fluid under pressure to release fluid under pressure from the relay valve device 9 by reverse flow through the communication just described for thereby effecting a release of fluid under pressure from the brake cylinder device 11 and thereby a release of brakes on the locomotive.

Associated with the brake controlling valve device 2 on each unit of the locomotive is an interlock valve device 12 comprising, in addition to the double check valves 5 and 7, a selector valve device 13 and an independent brake release valve device 14.

Each selector valve device 13 comprises a piston 15 open at one side to a chamber 16 in constant communication with atmosphere through a vent port 17 and open at the opposite side to a valve chamber 18 adapted to be constantly supplied through passage 19 with fluid under pressure from the usual main reservoir (not shown) on the locomotive. A slide valve 21 contained in chamber 18 is connected by a stem 22 to the piston 15 for movement therewith. The selector valve device further comprises a piston 23 of greater area than and arranged in coaxial relation to the piston 15 and subject on one side to atmospheric pressure in chamber 16 and on the opposite side to pressure of fluid in a chamber 24.

When chamber 24 is vented pressure of fluid in chamber 18 will move the piston 15 and thereby the slide valve 21 to a lower or normal position in which they are shown in the drawing. When fluid under pressure is supplied to chamber 24, piston 23 being of greater area than piston 15 will move against and then actuate piston 15 and the slide valve 21 to an upper or independent brake release position.

In the normal position of slide valve 21 a cavity 25 therein opens the straight air pipe 2 to a passage 26 leading to the upper end of the double check valve 5 whereby when fluid under pressure is supplied to said straight air pipe with said slide valve in normal position such fluid will become effective on the upper end of the double check valve 5 and move it to its lower position so as to permit flow to passage 6 and thence to the lower end of the double check valve 7 for moving it to its upper position and then flow to passage 8 and thence to the relay valve device 9 for actuating same to supply fluid at a corresponding pressure to the brake cylinder device 11 for effecting an electro-pneumatic straight air application of brakes on the locomotive unit. Upon release of fluid under pressure from the straight air pipe 2, by reverse flow fluid will be released from the relay valve device 9 which will operate to effect a like release of fluid under pressure from the brake cylinder device 11 for releasing an electro-pneumatic straight air application of brakes on the locomotive.

The independent release valve device 14 comprises a check valve 27 contained in a chamber 28 which is constantly open through the annular chamber 29 encircling the double check valve 7 to passage 8 and thereby to the relay valve device 9. The check valve 27 is arranged to cooperate with a seat 30 for closing communication between chamber 28 and an atmospheric vent port 31, a spring 32 contained in chamber 28 acting on said check valve for urging it into contact with said seat. A stem 33 provided for engagement with the seating side of check valve 27 extends through passage 31 and a casing bore, in slidable contact therewith, into a chamber 34 where it is provided with a follower head 35 engaging one side of a flexible diaphragm 36. At one side of diaphragm 36 is the chamber 34 while at the opposite side is a chamber 37 connected, respectively, by passages 39 and 38 to the seat of the selector slide valve 21 and said passages are connected to each other through a choked communication 40.

The selector slide valve 21 has a cavity 41 which, in the normal position of said valve, opens passage 38 to an atmospheric vent port 42, the chamber 34 being also vented at this time through the choked communication 40 and passage 38. With the pressures of fluid in chambers 37 and 34 thus equal a spring 43 contained in chamber 34 and acting on the diaphragm follower 35 will deflect the diaphragm 36 and move the stem 33 to the position in which they are shown in the drawing and in which said stem is out of contact with the check valve 27 to permit closing thereof by spring 32. With the check valve 27 thus closed fluid under pressure supplied to passage 8 and thereby to the check valve chamber 28 either by operation of the brake controlling valve device 3 or from the straight air pipe 2 will be held against dissipation through the atmospheric vent port 31 so that it may become effective in the relay valve device 9 to cause an application of brakes on the locomotive unit.

When by operation of piston 23 in response to supply of fluid pressure to chamber 24, the slide valve 21 is moved out of its normal position, in which it is shown in the drawing, to its brake release position, a port 45 in said slide valve will move into registry with passage 38 and open said passage to valve chamber 18, as a result of which, fluid under pressure from said valve chamber will flow to passage 38 and thence to diaphragm chamber 37. When fluid under pressure is thus supplied to passage 38 a portion of such fluid will flow therefrom through the choked communication 40 to passage 39, but the latter passage will be open at this time through a cavity 46 in said slide valve to a passage 47 connected to an application and release pipe 48 extending through the locomotive and which pipe may be vented as will be later described. As a result, sufficient pressure will be promptly obtained in diaphragm chamber 37 over that in chamber 34 to deflect diaphragm 36 against spring 43 to actuate stem 33 to unseat the check valve 27. With the fluid pressure brakes of the locomotive unit applied by fluid under pressure from either the brake controlling valve device 3 or the straight air pipe 2 as above described, the unseating of check valve 27 will allow the actuating fluid pressure in the relay valve device 9 to be vented to atmosphere through the vent port 31 whereupon said relay valve device will operate to release the fluid under pressure from the brake cylinder device 11 for effecting a release of the brakes on the locomotive unit. It will be noted, therefore, that either an automatic application of fluid pressure brakes on the locomotive effected in response to a reduction in pressure of fluid in brake pipe 1 and consequent operation of the brake controlling valve device 2, or a straight air application of brakes effected by supply of fluid under pressure to the straight air pipe 2, may be released independently of the brake pipe 1 or straight air pipe 2, and hence independently of brakes on cars of a train by supplying fluid under pressure to piston chamber 24 of the selector valve device 13.

An actuating pipe 49, as well as the application and release pipe 48, are adapted to extend through the several units of the locomotive and on each of the A units both of said pipes are adapted to be connected through a cut-out valve 50 to an engineer's independent brake valve device 52.

The independent brake valve device 52 comprises an engineer's control handle 53 operable through the medium of a shaft 54 and a cam 55 thereon to control operation of a self-lapping valve mechanism 56 in an application and release zone (Fig. 2), and through the medium of another cam 57 to effect opening of a cut-off valve 58 in said zone and to permit closing of said valve by a spring 60 upon movement of said handle to a locking position (Fig. 2). The handle is also depressible against a spring pressed plunger 61 carried by shaft 54 for operating an independent release valve mechanism 62.

The self-lapping valve mechanism 56 comprises a plunger 63 slidably mounted in the casing with one end engaging the cam 65, and fulcrumed intermediate its ends on a pin 64 carried by said plunger is an equalizing lever 65. One end of lever 65 is connected to a pin 66 which engages a fluid pressure supply valve 67 contained in a chamber 68 which is constantly supplied with fluid under pressure from a fluid pressure supply pipe and passage 69 adapted to be constantly open to the main reservoir pipe (not shown) on the unit. A spring 70 in chamber 68 acts on the supply valve 67 for urging it to a closed position in which it is shown in the drawing. The opposite end of lever 65 carries a roller 71 bearing against the end of a stem of a release valve 72 carried by a piston 73 and arranged to cooperate with a seat on said piston for controlling communication between a chamber 74 at one side of said piston and a chamber 75 at the opposite side which latter chamber is open to atmosphere through a vent port 76. A control spring 77 in chamber 75 acts on piston 73 for opposing pressure of fluid in chamber 74 acting on said piston. A spring 78 acts on the stem of the release valve 72 for urging said valve out of contact with its seat on piston 73.

With the brake valve handle 53 in its release position, in which it is shown in the drawing, the cam 55 permits the plunger 63 to be so positioned as to permit closing of the supply valve 67 by spring 70, and full extension of the spring 77 and thereby opening of the release valve 72 by spring 78. The cam 55 is so designed that upon movement of the handle 53 from the release position into its application and release zone the plunger 63 will be displaced in the direction of the right hand an extent proportional to the degree of such movement. As the handle 53 is thus turned into the application and release zone the plunger 63 will therefore be operated to initially seat the release valve 72 on piston 73 and then the lever 65, turning about its connection with the end of the release valve stem, will unseat the supply valve 67 to permit flow of fluid under pressure from chamber 68 to chamber 74 and thence past the open cut-off valve 58 to the application and release pipe 48. As fluid under pressure is thus supplied to chamber 74, such pressure acting on piston 73 will move said piston against spring 77 according to the increase in such pressure. Assuming that movement of handle 73 is stopped in some intermediate position in the application and release zone, then fluid will continue to flow to chamber 74 and application and release pipe 48 until the movement of piston 73, with the exhaust valve 72 seated, permits such rocking of lever 65 as to permit closing of the supply valve 67 by spring 70 to prevent further supply of fluid under pressure to said chamber and pipe and thereby limiting the pressure of such fluid in accordance with the position of handle 73 in the application and release zone. If the handle 53 is moved further away from release position the self-lapping valve mechanism 56 will operate to effect a corresponding increase in pressure in chamber 74 and in the application and release pipe 48, while if the handle is moved back toward release position the supply valve 67 will remain seated and permit spring 78 to open the exhaust valve 72 for thereby releasing fluid under pressure from chamber 74. As the pressure of fluid in chamber 74 is thus released on the one side of piston 73 spring 77 will move said piston in the direction of the release valve 72. If handle 53 is stopped short of release position, thereby fixing the position of the release valve 72, the pressure of fluid in chamber 74 will continue to reduce until piston 73 engages said release valve for preventing further release of such fluid pressure to thereby limit the reduction in the pressure of such fluid in accordance with the new position of the handle 53. Upon the return of handle 53 to its release position the valve 72 will still be open when movement of piston 53 by spring 77 ceases to permit full release of fluid under pressure from chamber 74. It will thus be seen that the self-lapping valve mechanism 56 will provide in chamber 74 and thereby in the application and release pipe 48, when the cut-off valve 58 is open, fluid at a pressure corresponding to the position of said handle out of release position and permit such pressure to reduce to that of atmosphere in release position.

The independent release valve mechanism 62 comprises, for illustration, two oppositely seated valves 79 and 80 contained, respectively, in chambers 81 and 82 and having fluted stems extending in the direction of each other through suitable bores in the casing and meeting in an intermediate chamber 83. The chamber 81 is adapted to be constantly supplied with fluid under pressure from the fluid pressure supply pipe 69. The chamber 82 is open to atmosphere through a vent port 84 while chamber 83 is open to the actuating pipe 49 through a passage 85. A spring 86 contained in chamber 81 acts on the valve 79 for urging it to its closed position and at the same time opening the valve 80. Slidably mounted in the casing above valve 80 is a plunger 87 one end of which engages the valve 80 while the opposite end is disposed outside of the casing of the brake valve device where it is engaged by a vertically movable bail 88 fulcrumed at the opposite side of shaft 54 on a pin 89. The bail 88 is disposed beneath the brake valve handle 53 for engagement thereby, whereby upon depression of said handle from its normal elevated position it will engage said bail and actuate the plunger 87 to seat valve 80 and open valve 79. The bail 88 may thus be operated by handle 53 in release position of said handle, as well as in the application and release zone, and while depressed it may be moved to a locking position (Fig. 2) under a lip 90 and then be relieved of manual pressure whereupon said lip will hold said handle in its depressed position for holding the valve 80 closed and valve 79 open.

By moving handle 53 out of release position into the application and release zone, fluid at a corresponding pressure will be provided in the application and release pipe 48 as above described. When the brakes on the locomotive are released, such fluid will flow through cavity 46 in the slide valve 21 to the upper end of the double check valve 7 and thence through passage 8 to the relay valve device 9 for effecting an independent application of brakes on the locomotive. By return of the handle 53 to its release position, such an application of brakes may be released by reverse flow of fluid through the communication just described, as will be apparent.

If the brake valve handle 53 is depressed in its release position, the independent release valve mechanism 62 will be operated to supply fluid under pressure to the actuating pipe 49 and thus to piston chamber 24 in the selector valve device 13 to actuate said selector valve device to its independent release position for causing operation of the independent release valve device 14 to effect a release of brakes on the locomotive applied by operation of the brake controlling valve device 3 or by fluid from the straight air pipe 2. If the handle 53 is allowed to return to its upper position fluid under pressure will be vented from the piston chamber 24 in the selector valve device 13 past the open valve 80 in the brake valve device whereupon the parts of the selector valve device will return to normal position in which they are shown in the drawing. If the brake application released by depression of the brake valve handle 53 was a result of fluid under pressure present in the straight air pipe 2 the brakes will be automatically reapplied upon return of the brake valve handle 53 to its upper position by fluid under pressure from said pipe flowing through cavity 25 in the selector slide valve 21. In order to prevent such reapplication of the brakes on the locomotive unit by fluid under pressure from the straight air pipe 2 or to prevent all application of brakes on the unit by fluid under pressure from said pipe the handle 53 may be moved to its locking position for thereby, without manual pressure on the handle, maintaining the independent release portion 62 of the brake valve device in the position for supplying fluid under pressure to chamber 24 of the interlock valve device 13 whereby the selector slide valve 21 will be held in its upper position for disconnecting the straight air pipe from passage 26 and for supplying fluid under pressure to chamber 37 in the independent release valve device 14 and through the choked communication 40 to chamber 34 at the opposite side of diaphragm 36 in said valve device and to the application and release pipe 48. In locking position of the independent brake valve handle 53 the cut-off valve 58 in the brake valve device is closed so that through the choked communication 40 the pressure of fluid in the application and release pipe 48 and in diaphragm chamber 34 of the independent release valve device 14 will normally substantially equalize with that in chamber 37 to permit spring 43 to hold the diaphragm 36 in the position to permit the independent release valve 27 to close. With the independent release valve 27 thus closed if, due to a reduction in pressure in brake pipe 1 the brake controlling valve device 3 on the unit should operate to supply fluid under pressure to passage 4, such fluid will become effective in the relay valve device 9 to cause an application of brakes on the locomotive unit, it being desired to point out however, that the obtaining of such an application of brakes is dependent upon the independent release valve 27 being closed as just mentioned.

If when the engineer depresses the brake valve handle 53 to effect a release of brakes on the locomotive caused by operation of a brake controlling valve device 3 or by pressure of fluid from the straight air pipe 2 he also moves said handle to its locking position for closing the cut-off valve 58, the application and release pipe 48 and chamber 34 under the diaphragm 36 of the independent release valve device 14 will promptly start to be charged with fluid under pressure through the choked communication 40. The flow capacity of this choked communication is, however, such that insufficient pressure will be obtained in the application and release pipe and diaphragm chamber 34 to permit spring 43 to deflect the diaphragm 36 back to its normal position to permit closing of valve 27 for a time period adequate to insure a complete release of the brake application. If the flow capacity of the choked communication 40 were greater, then the independent release valve 27 might close before a complete release of the application of brakes on the locomotive unit occurred while, if less, the closing of said release valve would be unduly delayed and it possibly might be open at a time when the brake controlling valve device 3 operated to supply fluid under pressure for effecting an application of brakes and permit dissipation of such fluid without obtaining such application. In case the brake valve handle 53 were merely depressed in its release position for effecting release of an application of brakes on the locomotive and in which position the application and release pipe 48 is open to atmosphere past the open cut-off valve 58 and the self-lapping valve mechanism 56 in said brake valve device, fluid under pressure flowing through the choked communication 40 to said pipe is vented to atmosphere so that it would be undesirable to have said communication of any greater capacity than necessary to accomplish the desired result.

The structure and operation of the brake equipment so far described is the same as the 24RL equipment disclosed in the Instruction Pamphlet above referred to.

In actual service there is generally leakage of fluid under pressure from the application and release pipe 48 at the coupling connections between the different units of the locomotive and if this leakage is sufficient, even within a permissible limit, at the time the independent brake valve handle 53 is moved to its locking position for effecting release of an application of brakes on the locomotive, effected either by operation of the brake controlling valve device 3 or by pressure of fluid from the straight air pipe 2, the fluid supplied to said application and release pipe through the choked communication 40 may not be able to increase the pressure of fluid in said pipe and in the diaphragm chamber 34 of the independent release valve device 14 against such leakage fast enough to insure closing of the independent release valve 27 within the desired time limit, or such leakage may even equal the capacity of the choked communication 40 to supply fluid under pressure to said pipe and chamber and prevent closing of said independent release valve. In either case, if the brake controlling valve device 3 should operate to effect an application of brakes on the locomotive such application may be less than intended due to delayed closing of the independent release valve 27 or may not materialize at all in case said valve remains open. This is objectionable and is overcome by the invention which will now be described.

According to the invention I modify the cam 55 in the brake valve device by the provision of a raised portion 92 thereon (Fig. 2) which is operative in the locking position of the brake valve handle 53 to actuate the self-lapping valve mechanism 56 to provide in chamber 74 fluid at the pressure in the fluid pressure supply pipe 69. I further provide a restricted passage 93, by-passing the cut-off valve 58 which is closed in the locking position, for thereby supplying fluid under pressure from the chamber 74 to the application and release pipe 48 at the brake valve device. This restricted supply of fluid under pressure through the port 93 in the brake valve device when in locking position, in addition to the supply through the choked communication 40 on each locomotive unit, to the application and release pipe 48 will off-set maximum permissible leakage of fluid under pressure at the couplings in the application and release pipe between the different units of the locomotive to thereby insure build-up of pressure in chamber 34 of the independent release valve device 14 and closing of the independent release valve 27 within the desired time limit.

It will be apparent that if the cut-off valve 58 were open in the locking position of handle 53 fluid under pressure would be supplied to the application and release pipe 48 the same as occurs through the port 93. The flow area of the opening past the valve 58 when open is such however as to provide a desired rate of independent application and release of locomotive brakes and therefore so in excess of the permissible rate of supply in the locking position of handle 53 as to preclude the opening of said valve in said position. Hence the port 93 is necessary, and its flow capacity is so limited as to prevent such drain in the fluid pressure supply system of the locomotive as to jeopardize the integrity of the automatic and electro-pneumatic brake system in case the application and release pipe 48 should become broken when it is desired to hold the locomotive brakes released with the brake valve handle 53 in locking position. It is also necessary when the brake valve handle 53 is moved to locking position for preventing an electro-pneumatic application of locomotive brakes that the supply of fluid under pressure to the application and release pipe be so restricted, as by the port 93, as to prevent any application of brakes on the locomotive by flow of such fluid through the selector valve device 13 to the relay valve device 9 before sufficient pressure is obtained in the actuating pipe 49 and chamber 24 of the selector valve device 24 for moving the parts of said selector valve device to their independent release position in which the communication between the application and release pipe 48 and relay valve device 9 is closed by the selector slide valve 21.

*Summary*

It will now be seen that I have provided means for insuring closing of the independent release valve 27 in the brake controlling valve device employed in the 24RL brake equipment on different units of the locomotive within the desired time limit even in case of a maximum permissible leakage of fluid under pressure from the application and release pipe, so as to thereby insure obtaining of an automatic application of the fluid pressure brakes on the locomotive in case of operation of the brake controlling valve devices on the units immediately following the release of an application by moving the independent brake valve handle to its locking position.

Having now described my invention, what I claim as new and desire to secure by Letters Patent, is:

1. In a locomotive brake equipment, in combination, a brake application and release pipe, an engineer's independent brake valve device comprising a fluid pressure supply and release valve mechanism, a brake valve handle having a release position, an application and release zone and a locking position at opposite sides of said release position, means controlled by said handle in said release position to effect operation of said mechanism to open said pipe to atmosphere, and means operable by said handle upon positioning in said zone to effect operation of said mechanism to supply fluid to said pipe at a pressure proportional to the distance from said release position, and means operable by said handle in said locking position for also supplying fluid under pressure to said pipe, and means for restricting said supply of fluid under pressure to said pipe in said locking position.

2. In a locomotive brake equipment, in combination, a brake application and release pipe, an engineer's independent brake valve device comprising a fluid pressure supply and release valve mechanism, a brake valve handle having a release position, an application and release zone and a locking position at opposite sides of said release position, means controlled by said handle in said release position to effect operation of said mechanism to open said pipe to atmosphere, means operable by said handle upon positioning in said zone to effect operation of said mechanism to supply fluid to said pipe at a pressure proportional to the distance from said release position, a cut-off valve controlling communication between said mechanism and pipe, means operative by said handle in said release position and zone to open said valve and to permit closing of said valve in said locking position, and means for supplying fluid under pressure to said pipe in said locking position.

3. In a locomotive brake equipment, in combination, a brake application and release pipe, an engineer's independent brake valve device having a pressure chamber and comprising a fluid pressure supply and release valve mechanism, a brake valve handle having a release position, an application and release zone and a locking position at opposite sides of said release position, means controlled by said handle in said release position to effect operation of said mechanism to open said chamber to atmosphere, means operable by said handle upon positioning in said zone to effect operation of said mechanism to supply fluid to said chamber at a pressure proportional to the distance from release position and operable by said handle in said locking position to also supply fluid under pressure to said chamber, a cut-off valve controlling communication between said chamber and pipe, means operable by said handle in said release position and zone to open said cut-off valve and to permit closing of said valve in said locking position, and a restricted communication by-passing said cut-off valve opening said chamber to said pipe.

4. In a locomotive brake equipment, in combination, brake release means controlled by opposing pressures of fluid in two chambers and operable by a chosen higher pressure of fluid in one of said chambers than in the other to a brake release position and operable out of brake release position upon substantial equalization of such opposing pressures, valve means having a normal position for equalizing the fluid pressures in said chambers and movable to a brake release position for supplying fluid under pressure to said one chamber at one rate and to the other chamber at a slower rate, an application and release pipe open to said other chamber, and an engineer's brake valve device having a normal position for opening said pipe to atmosphere and another position to effect movement of said valve means to said brake release position and for supplying fluid under pressure to said pipe.

5. In a locomotive brake equipment, in combination, brake controlling means operable by fluid under pressure to effect an application of brakes, a release valve for releasing such fluid under pressure, movable abutment means controlled by opposing pressure of fluid in chambers at respectively opposite sides of said abutment means and operable by a chosen higher pressure in one of said chambers than in the other to open said release valve, means operable upon substantial equalization of said opposing pressures to close said release valve, selector means operable to a normal position upon venting of fluid under pressure from a third chamber for equalizing the fluid pressure in said chambers and for establishing communication through which fluid under pressure is adapted to be supplied to said brake controlling means and operable upon supply of fluid under pressure to said third chamber to close said communication and to supply fluid under pressure to said one chamber at one rate and to said other chamber at a slower rate, an application and release pipe opened to said other chamber by said selector means upon supply of fluid under pressure to said third chamber, and an engineer's brake valve device having a normal position for opening said pipe to atmosphere and for venting said third chamber and having another position for supplying fluid under pressure to said third chamber and to said application and release pipe.

6. In a locomotive brake equipment, in combination, brake controlling means operable by fluid under pressure to effect an application of brakes, a release valve for releasing such fluid under pressure, movable abutment means controlled by opposing pressure of fluid in chambers at respectively opposite sides of said abutment means and operable by a chosen higher pressure in one of said chambers than in the other to open said release valve, means operable upon substantial equalization of said opposing pressures to close said release valve, an application and release pipe, an actuating pipe, an engineer's brake valve device having a release position for venting said application and release pipe and an application and release zone for supplying fluid under pressure to said application and release pipe and operable in both said position and zone to vent said actuating pipe, selector means responsive to venting of said actuating pipe for equalizing opposing pressures in said one and other chambers and for establishing one communication for permitting flow of fluid under pressure to said brake controlling means and also another communication from said application and release pipe to said brake controlling means, a double check valve controlling communication between said one and other communications and said brake controlling means, said selector means being operative to another position upon supply of fluid under pressure to said actuating pipe to close said one and other communications and open said application and release pipe to said other chamber and to supply fluid under pressure to said one chamber at one rate and to said other chamber and application release pipe at a slower rate, said brake valve device having another position, and means operative in said other position of said brake valve device to supply fluid under pressure to both said actuating pipe and said application and release pipe.

7. In a locomotive brake equipment, in combination, brake controlling means operable by fluid under pressure to effect an application of brakes, a release valve for releasing such fluid under pressure, movable abutment means controlled by opposing pressure of fluid in chambers at respectively opposite sides of said abutment means and operable by a chosen higher pressure in one of said chambers than in the other to open said release valve, means operable upon substantial equalization of said opposing pressures to close said release valve, an application and release pipe, an actuating pipe, an engineer's brake valve device comprising self-lapping valve mechanism operable in a release position to open a chamber therein to atmosphere and operable in an application and release zone for supplying fluid under pressure to such chamber and also operable in a locking position to supply fluid under pressure to such chamber, said brake valve device comprising means operable in said release position and application and release zone for venting said actuating pipe and in said locking position to supply fluid under pressure to said actuating pipe, selector means responsive to venting of said actuating pipe for equalizing the pressures of fluid in said one and other chambers and for establishing one communication for permitting flow of fluid under pressure to said brake controlling means, and another communication from said application and release pipe to said brake controlling means, a double check valve controlling communication between said one and other communications and said brake controlling means, said selector means being operative to another position upon supply of fluid under pressure to said actuating pipe to close said one and other communications and to open said application and release pipe to said other chamber and to supply fluid under pressure to said one chamber at one rate and to said other chamber and application release pipe at a slower rate, said brake valve device comprising a cut-off valve controlling communication between the chamber therein and said application and release pipe and means for opening said cut-off valve in said release position and application and release zone and for closing said cut-off valve in said locking position, and a restricted communication arranged in by-passing relation to said cut-off valve for permitting flow of fluid under pressure from the chamber in said brake valve device to said application and release pipe with said brake valve device in locking position.

ANDREW T. GORMAN.

REFERENCES CITED

The following references are of record in the file of this patent:

UNITED STATES PATENTS

| Number | Name | Date |
|---|---|---|
| 2,464,977 | Gorman | Mar. 22, 1949 |
| 2,512,046 | Watson | June 20, 1950 |